United States Patent [19]
McHugh

[11] 4,046,223
[45] Sept. 6, 1977

[54] BEARING SUMP COOLING ARRANGEMENT

[75] Inventor: James D. McHugh, Schenectady, N.Y.

[73] Assignee: General Electric Company, Schenectady, N.Y.

[21] Appl. No.: 622,628

[22] Filed: Oct. 15, 1975

[51] Int. Cl.² .............................................. F01M 9/10
[52] U.S. Cl. .................................. 184/6.11; 60/39.08; 308/76; 184/104 B
[58] Field of Search ................... 184/6.11, 6.16, 6.22, 184/104; 60/39.08; 415/110, 111; 308/237, 238, 240, 76

[56] References Cited
U.S. PATENT DOCUMENTS

| | | | |
|---|---|---|---|
| 2,443,403 | 6/1948 | Smith | 308/76 |
| 2,809,078 | 10/1957 | Hartwig | 308/76 |
| 2,874,803 | 2/1959 | Gunberg | 60/39.08 |
| 2,886,133 | 5/1959 | Mauck | 60/39.08 |
| 3,150,900 | 9/1964 | Bruenig | 308/237 |
| 3,722,212 | 3/1973 | Stein | 60/39.08 |
| 3,746,128 | 7/1973 | Wunsch | 184/6.11 |

Primary Examiner—Samuel Feinberg
Attorney, Agent, or Firm—Erwin F. Berrier, Jr.

[57] ABSTRACT

A journal bearing for rotatably supporting a turbomachinery shaft is supported by a housing which defines a sump chamber around the bearing. Means are provided to deliver a flow of lubricating fluid to the journal bearing and to sequentially or serially spray or impinge the lubricating fluid, after use for lubricating purposes, against the inner wall surface of the housing to thereby provide cooling for the bearing sump without increasing the flow of lubricating fluid beyond that required for bearing lubrication.

3 Claims, 4 Drawing Figures

U.S. Patent  Sept. 6, 1977  4,046,223
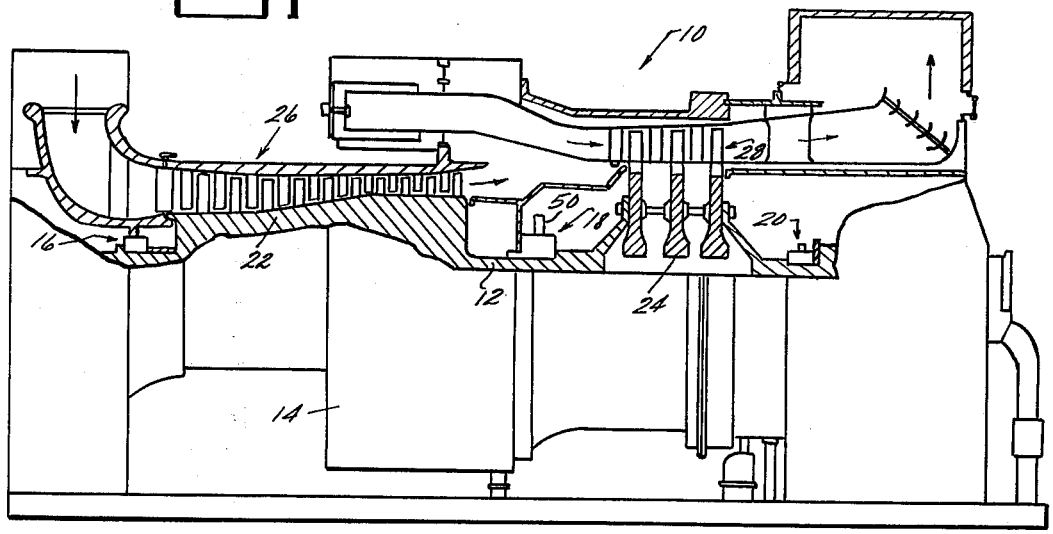
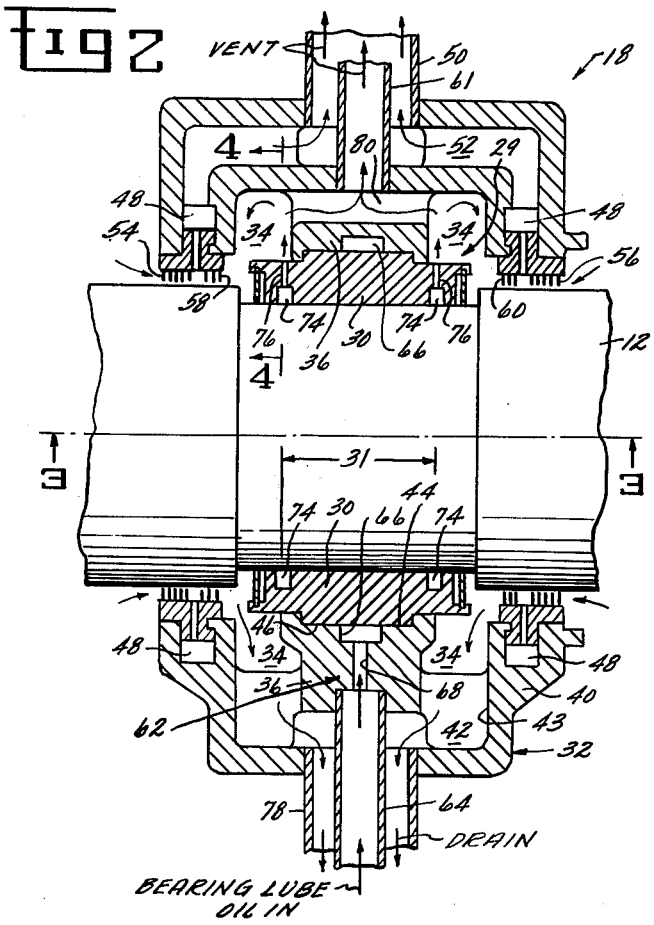
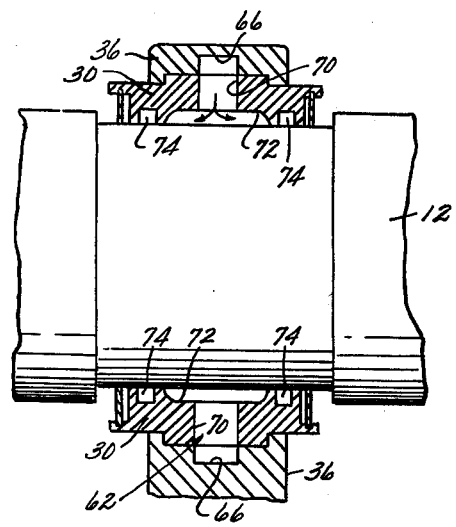
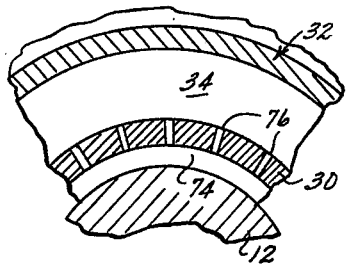

BEARING SUMP COOLING ARRANGEMENT

This invention relates to turbomachinery and more particularly, to an improved arrangement for cooling the bearing sump of a gas turbine.

BACKGROUND OF THE INVENTION

The bearings and bearing housings used in turbomachinery, such as gas turbines, are often located in a high temperature, high pressure environment. For example, when a bearing support is used between the compressor and turbine, the housing surrounding this bearing may be exposed to compressor discharge air which may be as hot as 600° F or higher. If the fluid used to lubricate the bearing is exposed to this high temperature, it may deteriorate, forming coke or sludge. Such deterioration may also form a combustible mixture or emit vapors having a low self-ignition temperature. For these reasons, it has heretofore been common practice to insulate the wall surface forming the sump chamber from the high temperature environment, for example, by providing one or more surrounding chambers which may be supplied with a source of cooling air. It has also been the practice to provide an oil spray arrangement to which lubricating fluid is delivered in parallel with the flow of lubricating fluid to the bearing. While such arrangements can be effective, they require additional lubricating fluid flow rate capacity over that which is required by the bearing for lubrication purposes only and they tend to become somewhat complex.

The objective of the present invention is to provide an effective arrangement for cooling the bearing sump of a gas turbine. A further objective of the present invention is to provide a gas turbine bearing sump cooling arrangement which does not require an increase in overall lubricating fluid flow rate.

SUMMARY OF THE INVENTION

Briefly stated, the above and other objects of the present invention are achieved in the present invention by providing means for delivery of lubricating fluid to the bearing surface of the journal bearing and for sequentially spraying the lubricating fluid, after use for lubricating purposes, against the inner wall surfaces of housing means which support the bearing and define the sump cavity in which the bearing is housed. The delivery and spray means include suitable passageways for delivery of the flow of lubicating fluid to the bearing surface of the journal bearing, means for collecting the lubricating fluid when it exits the area of the bearing to be lubricated, and means for spraying the collected lubricant against the inner wall surface of the housing. In one form, the collection means comprise radially inwardly facing annular collection grooves formed in the journal bearing liner at a position axially outwardly of the portion of the journal bearing containing the bearing surface and axially outwardly extending lubricant distribution grooves. The spray means may comprise passageways extending radially through the journal bearing liner and communicating with the collection grooves.

BRIEF DESCRIPTION OF THE DRAWINGS

While the application concludes with claims particularly pointing out and distinctly claiming the subject matter of this invention, it is believed that the invention will be better understood upon reading the following description of the preferred embodiment when taken in conjunction with the accompanying drawings, wherein:

FIG. 1 is a side elevational view in partial cross-section diagrammatically showing a heavy duty gas turbine employing the cooling arrangement of this invention;

FIG. 2 is an elevational cross-section drawn to an enlarged scale, of a bearing sump of FIG. 1;

FIG. 3 is a cross-sectional view taken along lines 3—3 of FIG. 2; and

FIG. 4 is a cross-sectional view taken along lines 4—4 of FIG. 2.

DESCRIPTION OF THE DRAWINGS

With reference now to FIG. 1, a gas turbine has been shown at 10 as having a shaft 12 suitably journaled for rotation within an outer casing 14 by suitable bearing at bearing support areas 16, 18 and 20. The shaft 12 includes a bladed compressor rotor 22 and a turbine rotor 24 which, in turn, form a part of the compressor 26 and turbine 28.

With reference now to FIG. 2, the bearing support area 18 of FIG. 1 has been shown in greater detail as including a journal bearing 29 comprising a bearing liner 30 which extends around and supports the shaft 12 at its journal (indicated at 31) for rotation therein. The bearing liner 30 is carried by housing means 32 which is preferably of cast construction and defines a sump cavity or chamber 34 around the bearing liner 30.

The housing means 32 of FIG. 2 includes a central hub portion 36 which is spaced from an outer wall portion 40 by a plurality of web members 42 so as to define the sump cavity between the hub portion 36 and an inner wall surface 43 of wall portion 40.

The hub portion 36 includes a radially inwardly facing annular recess 44 which receives a projecting rim 46 of the liner 30 so as to secure the liner 30 against axial movement.

The housing means 32 may be formed with an outer chamber 48 which communicates with a vent conduit 50 through suitable passageways 52 formed in the housing means 32.

Suitable sealing means are provided, as at 54 and 56, to reduce leakage flow from the outside of the housing into the outer chamber 48. In like manner, sealing means are provided, as at 58 and 60, to reduce leakage flow between the sump cavity 34 and the outer chamber 48.

The sump cavity 34 is vented at its upper portion by a suitable conduit 61 which may generally coaxial with and telescoped within conduit 50.

Suitable lubricant supply means are provided as at 62 to provide a continuous flow of lubricant to the liner/journal interface. The lubricant supply means 62 includes a conduit 64 which communicates with a source of lubricating fluid and projects into the bearing support hub portion 36, a circumferential distribution groove 66 found in the hub portion 36, a passageway 68 formed through the hub portion 36 and communicating conduit 64 with groove 66, and (see FIG. 3) passageways 70 and axial distribution grooves 72. With reference to FIG. 3, the circumferential distribution groove 66 defines a passageway in cooperation with the outer radial surface of the liner 30 to communicate the flow of lubricating fluid with the grooves 72 through the radial passageways 70 which are formed through the liner 30. The radially inwardly facing grooves 72 extend axially along the journal 31 so as to distribute the lubricating fluid along the length of the journal 31 of bearing 29.

A circumferential trough or radially inwardly facing annular groove 74 is provided adjacent each axial end of the liner 30 and axially outwardly of the axial distribution grooves 72 so as to collect the flow of lubricating fluid after flow along the bearing surface between shaft 12 and bearing 30.

As shown in FIGS. 2 and 4, a plurality of spray passageways 76 are formed radially through the journal 30 and communicate with each circumferential collection groove 74.

The passageways 76 are arranged and sized so as to spray the lubricating fluid against the upper portions of wall surface 43 in such a manner that this inner wall surface is continuously bathed in lubricating fluid as it flows by action of gravity to the bottom of sump cavity 34.

The sump cavity 34 may be drained by a suitable conduit, as at 78, communicating with the lower portion of cavity 34 through outer wall 40. Conduit 78 may be telescoped over the supply conduit 64.

The sump cavity 34 and outer chamber 48 are vented by telescoped, generally concentric, conduits 61 and 50, respectively.

The use, operation and function of the present invention are as follows. In practice, the housing 32 is usually surrounded by pressurized air at temperatures as high as 600° F or higher. The lubricating fluid used to lubricate the bearing must be protected from these high temperatures so as to prevent formation of coke or other deterioration of the lubricant, to prevent lubricant boil off and, possibly, to prevent lubricant fires.

The lubricant flow rate to the journal bearing 30 through delivery means 62 may be in the range of 45 to 72 gallons per minute, although it should be understood that the present invention is not limited to such a flow rate. It has been found that by sequentially spraying or impinging the journal bearing lubricant flow against the inner surface of the bearing sump chamber wall on the upper portion of the housing in accordance with the present invention, significant reductions can be achieved in the temperature of the air within the sump cavity 34 and the temperature of the outer wall 40. Accordingly, means are provided in the present invention to deliver lubricating fluid to the bearing surface of the journal beaing 30 and for sequentially or serially spraying the lubricating fluid against the inner surface 43 of the sump chamber 34.

In accordance with the present invention, the lubricating fluid is supplied to the bearing by way of means 62, is collected by suitable means such as collection grooves 74 at each axial end of the journal bearing, and is then sequentially or serially impinged as a plurality of sprays against the upper inner surface 43 of wall portion 40 by means such as spray passageways 76. While the bearing 30 is shown is FIG. 4 as having five such passageways at each axial end of the journal, it will be understood that the present invention is not so limited and that the number and form of these spray means may be varied. After being sprayed against wall surface 43, the lubricating fluid flows along the sidewalls by action of gravity to the lower portion of the sump cavity 34 where it is returned to its reservoir by drain conduit 78.

In tests conducted on bearing arrangements incorporating the present invention reductions in metal temperatures and bearing sump chamber air temperatures in the order of 150° F and 250° F, respectively, have been observed.

Where, as in the arrangement of FIG. 2, a passageway, as at 80, is provided at the top of the chamber 34 to communicate the chamber 34 with vent conduit 61, at least one of the spray passages 76 is preferably positioned so that the air flowing to passageway traverses the lubricant flow.

While a preferred embodiment of the invention has been depicted and described, such embodiment is intended to be exemplary only and not definitive, and it will be appreciated by those skilled in the art that many substitutions, alterations and changes may be made thereto without departing from the fundamental theme of the invention.

What is claimed is:

1. A turbomachine having a shaft, a journal bearing rotatably supporting said shaft, housing means enclosing and supporting said journal bearing and having an inner wall defining a sump chamber around said journal bearing, meand for delivery of a flow of lubricating fluid to said journal bearing and for sequentially spraying said flow of lubricating fluid against the inner wall of said housing means defining said sump chamber in a manner whereby the inner surface of said sump chamber is continuously wetted and thereby cooled by the lubricant flow, said means for delivery of lubricating fluid to the bearing and for sequentially spraying the lubricant flow including means for collecting the lubricant flow after use for lubricating purposes and before exiting said bearing, and a plurality of spray passageways formed in said bearing and communicating with said collection means, said journal bearing comprising an annular liner carried by said housing means and extending around a journal formed on said shaft, said lubricating fluid delivery and spray means including at least one radially inwardly facing distribution groove formed in said journal bearing liner for distributing the lubricating fluid along a central portion of the journal bearing, said collection means comprising a radially inwardly facing annular slot formed adjacent each axial end of said journal bearing liner and axially outwardly of said distribution grooves, said spray passageways being formed only through the upper portion of said journal bearing liner so as to spray the flow of lubricating fluid on the upper portions of the inner wall, the lower portions of the inner wall being bathed by gravity flow of said lubricating fluid.

2. The structure of claim 1 further characterized by and including sealing means to reduce the leakage flow of air along said shaft into said sump chamber, a vent conduit communicating with said sump chamber through an upper wall of said housing means to vent said sump and said leakage flow of air, said spray passageways formed and arranged such that said lubricant spray is traversed by the flow of leakage air from said sealing means to said vent conduit.

3. An improved journal bearing liner for use in a journal bearing of the type wherein the liner extends around and is located in close fitting relationship to a rotating shaft journal and is enclosed in a housing having inner wall surfaces defining a sump chamber around said journal bearing, passage means formed in the liner for delivery of a flow of lubricating fluid to the interface of the liner and the shaft journal, a radially inwardly facing annular groove formed in said liner adjacent each end thereof for collection of the flow of lubricating fluid, and a plurality of spray passageways formed through only the upper portions of said liner and communicating with said collection grooves, said spray passageways sized and formed so as to spray the flow of lubricating fluid against the upper inner wall surfaces of said bearing housing, whereby said upper inner wall surfaces will be continuously wetted by the spray of lubricating fluid and the lower inner wall surfaces of said bearing housing will be bathed by gravity flow of the lubricating fluid.

* * * * *

UNITED STATES PATENT OFFICE
CERTIFICATE OF CORRECTION

PATENT NO. : 4,046,223
DATED : September 6, 1977
INVENTOR(S) : James D. McHugh

It is certified that error appears in the above-identified patent and that said Letters Patent are hereby corrected as shown below:

In column 4, claim 1, line 19, the word "meand" should be "means".

Signed and Sealed this

Sixth Day of December 1977

[SEAL]

Attest:

RUTH C. MASON
*Attesting Officer*

LUTRELLE F. PARKER
*Acting Commissioner of Patents and Trademarks*